Figure 1:
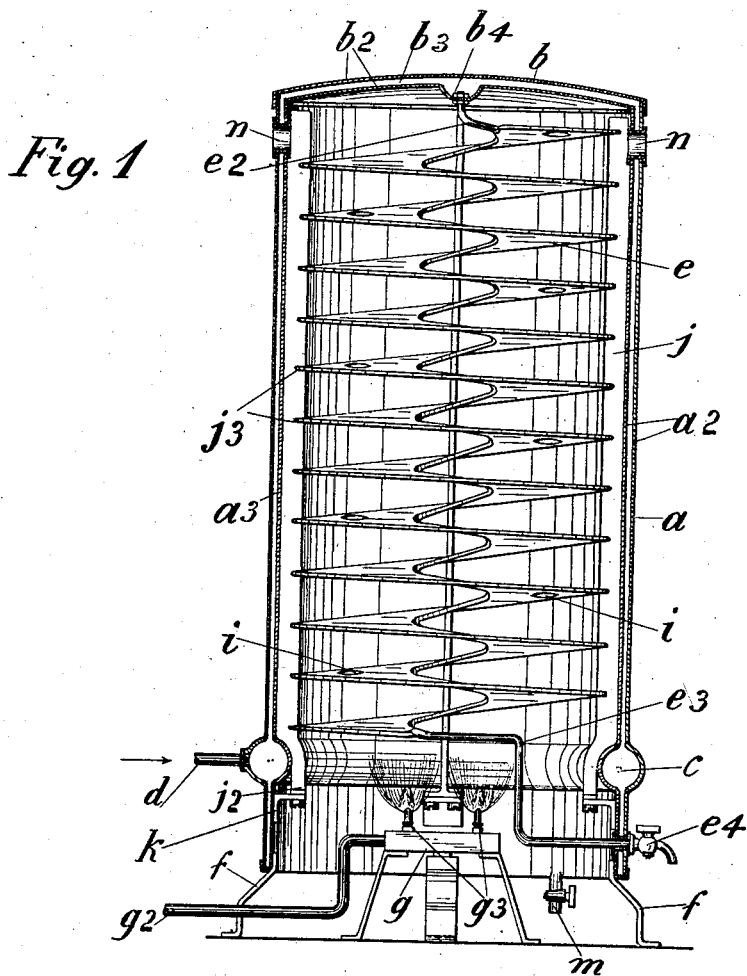

No. 894,351. PATENTED JULY 28, 1908.
S. TURANSKY.
WATER HEATER.
APPLICATION FILED DEC. 4, 1906. RENEWED JUNE 16, 1908.

WITNESSES
Paul Bartell
C. E. Mulreany

INVENTOR
Samuel Turansky
BY Edgar Tate & Co.
ATTORNEYS

UNITED STATES PATENT OFFICE.

SAMUEL TURANSKY, OF BROOKLYN, NEW YORK.

WATER-HEATER.

No. 894,351.  Specification of Letters Patent.  Patented July 28, 1908.

Application filed December 4, 1906, Serial No. 346,199. Renewed June 16, 1908. Serial No. 438,838.

*To all whom it may concern:*

Be it known that I, SAMUEL TURANSKY, a citizen of the United States, and residing at Brooklyn, in the county of Kings and State of New York, have invented certain new and useful Improvements in Water-Heaters, of which the following is a specification, such as will enable those skilled in the art to which it appertains to make and use the same.

This invention relates to devices for heating water for use in bath tubs and for other purposes wherein it is desired to heat water quickly; and the object thereof is to provide an improved device of this class which is simple in construction and operation and comparatively inexpensive and which may be used in connection with a bath tub or in connection with any other receiver into which water from the heater flows or will flow; a further object being to provide a water heater of the class specified which may be conveniently moved from one point to another and placed on a suitable support in any position where devices of this class are required.

The invention is fully disclosed in the following specification, of which the accompanying drawing forms a part, in which the separate parts of my improvement are designated by suitable reference characters in each of the views, and in which;—

Figure 2:
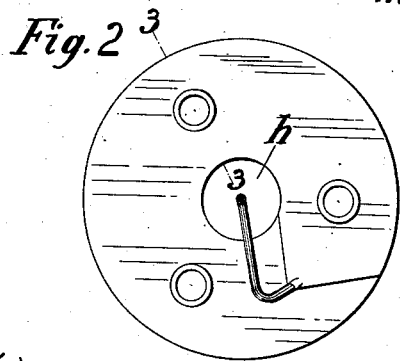

Figure 1 is a central vertical section of a cylindrical casing forming part of my improved water heater and showing the interior construction in full lines; Fig. 2 a plan view of a supplemental heating coil forming part of my improved water heater; and, Fig. 3 a section on the line 3—3 of Fig. 2.

In the practice of my invention, as shown in the drawing, I provide a cylindrical casing $a$ which is open at the bottom and provided with a closed top $b$. The casing $a$ comprises inner and outer walls $a^2$ and the top $b$ thereof is composed of inner and outer walls $b^2$, and the walls $a^2$ of the casing $a$ form a closed annular water chamber $a^3$ which communicates with a corresponding closed water chamber $b^3$ between the inner and outer parts of the top $b$.

The casing $a$ is provided at or near the bottom thereof with an annular enlarged chamber $c$ formed by curving the inner wall of said casing inwardly and the outer wall thereof outwardly, and connected with one side of said casing and communicating with the enlarged annular chamber $c$ is a water supply pipe $d$.

The inner wall $b^3$ of the top or cover $b$ of the casing $a$ is provided centrally with a depression $b^4$, and placed in said casing is a flat spiral coil $e$, the upper end of which is connected with the depression $b^4$ in the center of the inner part $b^3$ of the top $b$ of the casing $a$ by means of a pipe $e^2$, and the lower end of said coil is provided with a water pipe $e^3$ which extends out through the bottom portion of the casing $a$ and is provided with a faucet $e^4$.

The casing $a$ is preferably provided with legs $f$, and in practice, I employ a suitable form of gas burner $g$ which is placed under said casing and provided with a gas supply pipe $g^2$, and in the form of construction shown, the burner $g$ is provided with two ordinary burner tips $g^3$ which will be sufficient under ordinary conditions to supply all the heat necessary; but my invention is not limited to any particular form or construction of gas burners and any suitable burner or heat generator including an oil lamp or similar device may be placed under the casing $a$.

Figure 3:
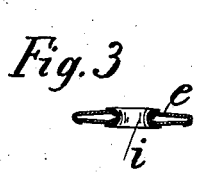

The coil $e$, as hereinbefore stated, is a flat coil and composed of top and bottom plates as shown in Fig. 3, and the position and formation of said coil forms a vertical passage $h$ which extends up through the center thereof, from the bottom to the top thereof, and through which the hot gases or products of combustion pass, and the separate spirals of said coil are provided with other ports or passages $i$ through which the hot gases or products of combustion also pass and said ports or passages $i$ are not arranged in the same vertical line in the separate spirals, and by reason of this construction the passage of the hot gases or products of combustion up through the casing $a$ is arrested and obstructed or delayed and the heat therefrom passes into the coil or the separate spirals thereof as will be readily understood. The diameter of the coil $e$ or the separate spirals thereof is less than the inner diameter of the casing $a$ and the hot gases or products of combustion also pass up around the separate spirals of said coil and the said separate spirals of said coil are connected by vertically arranged strips $j$ provided at the lower ends with feet $j^2$ which rest on brackets $k$ secured to the inner wall of the casing $a$, and the strips $j$ fit tightly against the inner wall of said casing, and said strips are preferably provided with notches or recesses $j^3$ in which the edges of the separate spirals of the coil $e$ are secured.

In the form of construction shown, the annular enlarged chamber $c$ is at considerable distance above the bottom of the casing $a$, and in practice I provide the bottom of said casing with a draw-off tube $m$ provided with a valve and by means of which water may be drawn from the chambers $a^3$ and $b^3$ when desired.

The annular spiral chamber formed in the separate spirals of the coil $e$ is very thin or of small transverse dimensions and the water passing therethrough flows in thin sheets and is instantly heated by the hot gases or products of combustion passing through the burner $g$ up through the casing, and in practice, the top portion of the casing is provided with ports or passages $n$ through which the products of combustion may pass, this being necessary in order to properly ventilate the casing $a$ and permit of a higher degree of combustion.

The annular chamber $a^3$ between the separate walls of the casing $a$ and the chamber $b^3$ between the separate walls of the top or cover $b$ of said casing are also very thin or of slight transverse dimension, and the water flows therethrough in thin sheets and the inner walls of said chambers become highly heated and this heat is transmitted quickly and instantly to the water in said chambers.

In the use of my improved heater it is placed in the desired position or on any suitable support and the faucet $e^4$ is opened. Water is then allowed to flow into the heater through the pipe $d$, the burner $g$ being lighted. The water passes into the heater under pressure and immediately rises in the chamber $a^3$, passes into and through the chamber $b^3$ and into the coil $e$ in the top thereof and down through said coil and is discharged through the faucet $e^4$. The first water to escape from the faucet $e^4$ will be heated water, and in this way water for bathing or other purposes may be almost instantly heated. Ordinary gas burner tips will be sufficient to heat the water, while it is passing through the heater to one hundred and fifty degrees and the longer the device is in operation the higher the degree to which the water is heated.

It will be observed that by means of my improved construction the greatest possible amount of heating surface is obtained and the water being compelled to flow in thin sheets through all the parts of the heater is almost instantly heated by the hot gases or products of combustion escaping from the burner $g$.

The device may be made of any desired dimensions and of any desired capacity, and changes in and modifications of the construction described may be made without departing from the spirit of my invention or sacrificing its advantages.

Having fully described my invention, what I claim as new and desire to secure by Letters Patent, is:—

1. A water heater, comprising a cylindrical double walled casing forming a thin annular chamber and provided with a double walled top between the separate parts of which is a thin chamber in communication with that between the walls of the casing, and a spiral coil connected with the inner wall of the top of the casing and provided at its lower end with a pipe which extends out through the bottom portion thereof, the coils of the said spiral being flattened so as to form a thin flat passage therethrough, and the sides of said coil being provided with vertically arranged strips which are secured thereto and which center and support said coil in said casing.

2. A water heater, comprising a cylindrical double walled vertically ranged casing provided with a double walled top, the walls of casing and the walls of the top forming thin chambers which are in communication, and the bottom wall of the top being provided with a central depression and the bottom portion of the casing being provided with an annular enlarged chamber with which a water supply pipe is connected, and a spiral coil centered and supported in said casing, and the upper end of which is connected with the central depression in the bottom wall of the top of the casing and the lower end of which is provided with a discharge pipe which extends outwardly through said casing, and a gas burner placed under said casing substantially as shown and described.

3. A water heater, comprising a cylindrical double walled vertically ranged casing provided with a double walled top, the walls of casing and the walls of the top forming thin chambers which are in communication, and the bottom wall of the top being provided with a central depression and the bottom portion of the casing being provided with an annular enlarged chamber with which a water supply pipe is connected and a spiral coil centered and supported in said casing, and the upper end of which is connected with the central depression of the bottom wall of the top of the casing and the lower end of which is provided with a discharge pipe which extends outwardly through said casing, and a gas burner placed under said casing, the separate spirals of the coils being narrow and flat in cross section and being provided with apertures, substantially as shown and described.

4. A water heater, comprising a cylindrical double walled vertically arranged casing provided with a double walled top, the walls of the casing and the walls of the top forming thin chambers which are in communication, the bottom of the chamber in the casing being provided with an annular enlargement, a water supply pipe connected with said annular enlargement, a spiral coil centered and supported in said casing and extending from the top to the bottom thereof, and the upper end of which is in communication with the chamber in the top and the lower end of which is provided with a laterally directed discharge spout.

5. A water heater, comprising a cylindrical double walled vertically arranged casing provided with a double walled top, the walls of the casing and the walls of the top forming thin chambers which are in communication, the bottom of the chamber in the casing being provided with an annular enlargement, a water supply pipe connected with said annular enlargement, a spiral coil centered and supported in said casing and extending from the top to the bottom thereof, and the upper end of which is in communication with the chamber in the top and the lower end of which is provided with a laterally directed discharge spout, and said casing being also provided in the top portion thereof with openings or apertures.

6. A water heater, comprising a cylindrical double walled vertically arranged casing provided with a double walled top, the walls of the casing and the walls of the top forming thin chambers which are in communication, the bottom portion of the chamber in the casing being provided with an annular enlargement below which said chamber is extended downwardly and provided with a discharge connection, a water supply pipe connected with said annular enlargement, a spiral coil centered and supported in said casing and extending from the top to the bottom thereof and the upper end of which is in communication with the chamber in the top of said casing and the lower end of which is provided with a laterally directed discharge spout, the bottom of said casing being also open and the top portion thereof provided with outlet ports or passages.

In testimony that I claim the foregoing as my invention I have signed my name in presence of the subscribing witnesses this 1st day of December 1906.

SAMUEL TURANSKY.

Witnesses:
C. E. MULREANY,
PAUL BARTELL.